United States Patent

Isomura et al.

[11] Patent Number: 5,848,775
[45] Date of Patent: Dec. 15, 1998

[54] SEAT SLIDE DEVICE

[75] Inventors: Tohru Isomura, Hiratsuka; Masao Sebata, Ayase; Teruaki Inoue, Fujisawa, all of Japan

[73] Assignee: Ikeda Bussan Co., Ltd., Ayase, Japan

[21] Appl. No.: 587,926

[22] Filed: Jan. 17, 1996

[30] Foreign Application Priority Data

Jan. 23, 1995 [JP] Japan .................................. 7-027379

[51] Int. Cl.$^6$ .................................................. F16M 13/00
[52] U.S. Cl. ........................................... 248/430; 248/429
[58] Field of Search ..................................... 248/429, 430, 248/424, 419; 297/344.1, 344.14, 337; 296/65.1

[56] References Cited

U.S. PATENT DOCUMENTS

| | | | |
|---|---|---|---|
| 4,821,989 | 4/1989 | Munakata et al. | 248/430 |
| 5,183,234 | 2/1993 | Saito | 248/430 |
| 5,192,045 | 3/1993 | Yamada et al. | 248/430 |
| 5,447,352 | 9/1995 | Ito et al. | 248/429 |
| 5,499,788 | 3/1996 | Rees | 248/430 |
| 5,529,397 | 6/1996 | Yoshida | 248/430 |

FOREIGN PATENT DOCUMENTS 61-295143  12/1986  Japan ................................... 248/430
2 219 933  12/1989  United Kingdom .

Primary Examiner—Derek J. Berger
Assistant Examiner—Gwendolyn Baxter
Attorney, Agent, or Firm—Foley & Lardner

[57] ABSTRACT

A seat slide device comprises a rail unit consisting of upper and lower guide rails and rollers disposed between the upper and lower guide rails. The upper guide rail includes a substantially channeled member consisting of a downwardly-opening, channeled portion, a vertical portion extending vertically and longitudinally from an upper wall of the downwardly-opening, channeled portion, and flanged portions formed at lower ends of both side walls of the downwardly-opening, channeled portion. The flanged portions of the upper guide rail are slidably engaged with the respective flanged portions of the lower guide rail when assembling. The vertical portion, the downwardly-opening, channeled portion, and the flanged portions of the upper guide rail are integrally formed by bending a piece of metal sheet. The vertical portion is formed by doubling over the metal sheet at an essentially center of the metal sheet. By caulking a flanged portion formed on one vertical wall section of the vertical portion doubled by burring or hole-flanging onto the perimeter of a circular hole formed on the other vertical wall section of the vertical portion doubled by punching, the opposing wall sections of the vertical portion are firmly secured to each other.

5 Claims, 4 Drawing Sheets

10

SEAT SLIDE DEVICE

BACKGROUND OF THE INVENTION

1. Field of the Invention

The present invention relates to a seat slide device suitable for use in automotive vehicles, and specifically to a seat slide device employing a lower stationary guide rail rigidly mounted on the floor panel of the vehicle body, an upper guide rail slidably fitted to the lower guide rail and firmly secured to the bottom of the automobile seat, and ball bearings and rollers provided in the lower stationary guide rail between the bottom surface of the lower guide rail and the horizontal portion of the upper slidable guide rail for rolling movement therebetween and for smooth sliding movement of the upper guide rail to the lower guide rail.

2. Description of the Prior Art

As is generally known, an automobile seat assembly traditionally employs a manually-operated or a motor-powered seat slide device between the seat cushion and the floor of the vehicle. To provide an optimal driving position of the driver or to provide an optimal position of the vehicle occupant on the seat, the forward-and-back adjustment of the seat cushion and the angular adjustment of the seat back are provided. Depending on a figure or shape of the vehicle occupant, the forward-and-back adjustment can be properly achieved by way of the seat slide device. Referring now to FIG. 5, there is shown one example of a prior art seat slide device. As seen in FIG. 5, the lower guide rail 2 of the conventional seat slide device 1 has an upwardly-opening, substantially C-channeled bottom portion 2a, a pair of side wall portions 2b, and an opposing pair of flanged portions 3 inwardly bent from upper ends of the side wall portions 2b, respectively into a substantially reversed U-shape. Front and rear ends of the lower guide rail 2 are fixed onto the floor of the vehicle by means of front and rear mounting brackets 4a and 4b. For the purpose of assembling the upper guide rail 5 into the lower guide rail 2, the upper guide rail 5 is often formed into a substantially reversed T-shape. The upper guide rail 5 includes horizontally-extending portions 5a, vertically-extending portions 5c, and upwardly-bent portions 5b bent upwardly from both ends of the horizontally-extending portions 5a. The upwardly-bent portion 5b and a part of the corresponding horizontally-extending portion 5a are engaged with the flanged portion 3 of the lower guide rail 2 via a plurality of ball bearings 9b. As appreciated, the upwardly-bent portion 5b and the part of the horizontally-extending portion 5a function as an engaged portion 7, whereas the flanged portion 3 functions as an engaging portion. Reference numeral 9a denotes a roller provided between the horizontally-extending portion 5a of the upper guide rail and the bottom surface of the lower guide rail for sliding movement of the upper guide rail to the lower guide rail. As clearly seen in FIG. 5, the upper guide rail 5 is constructed such that a pair of substantially L-shaped bent members, each having identical dimensions and shape, are integrally connected to each other usually by welding under a particular condition wherein the opposing vertically-extending portions 5c are precisely fitted to each other without any offset. Ordinarily mounted on the vertically-extending portions 5c of the upper guide rail 5 are an anchor member for a seat belt, and a base plate for a reclining mechanism. Optionally mounted on the vertically-extending portions 5c of the upper guide rail 5 is a pivot shaft for a seat lifter for the purpose of up-and-down movement of the seat assembly.

Referring to FIG. 6, there is shown another example of a prior art seat slide device. Since the basic construction of the seat slide device shown in FIG. 6 is similar to that shown in FIG. 5, the same reference numerals used in the seat slide device 1 of FIG. 5 will be applied to the corresponding elements used in the seat slide device 10 of FIG. 6, for the purpose of comparison. The device 10 shown in FIG. 6 is different from the device 1 shown in FIG. 5 in that the previously-noted reversed T-shaped upper guide rail 5 is replaced with a downwardly-opening, substantially hat-shaped upper guide rail 6. The upper guide rail 6 is composed of downwardly-opening, horizontally-extending upper wall portions 6a, vertically-extending side wall portions 6b, and a pair of flanged portions 7 outwardly bent from the lower ends of the side wall portions 6b, respectively into a substantially L-shape. The upper guide rail 6 is formed with a vertical portion 6c extending along the central line of the upper wall portions 6a in the longitudinal direction of the upper guide rail. As seen in FIG. 6, a carrier 8 is provided for suitably supporting the corresponding ball bearing pair 9b and roller 9a between the upper and lower guide rails 2 and 6, while allowing rotational motion of the respective bearings 9a and 9b. In old seat slide device installed on earlier-model cars, in which ball bearings and rollers are not provided between upper and lower guide rails, the metal surface of the upper guide rail is in sliding-contact with the metal surface of the lower guide rail. As is well known, a sliding resistance is greater than a rolling resistance. Thus, in old seat slide device without any bearings, there is a greatly-increased tendency for a sliding resistance to rapidly increase during sliding motion of the upper rail to the lower rail, owing to undesired deformation of the guide rail based on a poor bending accuracy or undesired torsion based on a poor installation of the guide rail assembly on the vehicle. Such a greatly-increased sliding resistance often disturbs a smooth sliding motion of the upper guide rail with noise or often results in an undesired malfunction of the seat slide device. To avoid this, in the conventional seat slide devices as shown in FIGS. 5 and 6, ball bearings and rollers are provided between the guide rail pair. On seat slide devices with bearings, each of upper and lower guide rails has generally a complicated shape in cross section for a proper support of the bearings, and thus machining for the guide rail is troublesome. In case of the upper guide rail of the seat slide device 1 shown in FIG. 5, to produce the upper guide rail 5, two pieces of metal plates must be subjected to bending and then the two bent metal plates must be integrally connected to each other by welding, riveting or the like. Also, it is necessary that the two bent metal plates are fitted to each other with a high accuracy to insure a precise horizontal plane at the bottom surface of the upper guide rail. Such an assembling process is very troublesome, and thus total production costs of the seat slide device increases. As appreciated, the welding process produces welding heat and welding distortion. As a result of welding, it is difficult to ensure a high dimensional accuracy of the upper guide rail such as a high flatness or a high parallelism. Undesired play resulting from welding distortion has a bad influence on sliding motion of the upper guide rail relative to the lower guide rail. On the other hand, in case of the upper guide rail 6 of the conventional seat slide device 10 shown in FIG. 6, the vertical portion 6c of the upper guide rail 6 is integrally connected to the upper wall portion 6a usually by spot-welding. Thus, similarly to the upper guide rail 5 of the seat slide device shown in FIG. 5, the flatness or the parallelism of the upper guide rail 6 may be lowered owing to welding. Additionally, the upper guide rail shown in FIG. 6 includes a substantially hat-shaped bent member (6a, 6b) having a pair of substantially C-shaped small flanged portions 7. As is generally known, such a press part, namely the above-noted hat-shaped bent member would not be easily produced by bending, because the distance between the upwardly-extending portion of one flanged portion 7 and a side wall portion 6b close to the one flanged portion, the distance between the upwardly-extending portion of the other flanged portion 7 and a side wall portion 6b close to the other flanged portion, and the distance between the opposing side wall portions 6b was relatively short.

SUMMARY OF THE INVENTION

Accordingly, it is an object of the invention to provide an improved seat slide device that avoids the foregoing disadvantages of the prior art.

It is another object of the invention to provide an inexpensive seat slide device that can provide a high productivity, a high dimensional accuracy, a superior mechanical strength, a high ability of sliding motion of one guide rail fitted to another guide rail, without undesired noise and undesired play.

It is a further object of the invention to provide an improved manufacturing method for producing an upper guide rail incorporated in a seat slide device.

In order to accomplish the aforementioned and other objects of the invention, a seat slide device comprises a lower guide rail fixed onto a floor panel, an upper guide rail slidably fitted onto the lower guide rail and firmly secured onto a bottom of a seat cushion, rollers disposed between the upper and lower guide rails for smooth sliding movement of the upper guide rail to the lower guide rail, the lower guide rail including an upwardly-opening, channeled portion through which the lower guide rail is fixed onto the floor panel, and flanged portions formed at upper ends of both side walls of the upwardly-opening, channeled portion, and the upper guide rail including a downwardly-opening, channeled portion fitted onto the upwardly-opening, channeled portion of the lower guide rail, a vertical portion extending vertically and longitudinally from an upper wall of the downwardly-opening, channeled portion, and flanged portions formed at lower ends of both side walls of the downwardly-opening, channeled portion, and the flanged portions of the upper guide rail are slidably engaged with the respective flanged portions of the lower guide rail when assembling, wherein the vertical portion, the downwardly-opening, channeled portion, and the flanged portions of the upper guide rail are integrally formed by bending a piece of metal sheet. The vertical portion may be preferably formed by doubling over the metal sheet at an essentially center of the metal sheet. A first vertical wall section of the vertical portion has at least one through-opening and a second vertical wall section opposing the first vertical wall section has at least one flanged hole opposing the through-opening. After inserting a flanged portion of the flanged hole into the through-opening, the first and second vertical wall sections are firmly secured to each other by caulking the flanged portion of the flanged hole onto a perimeter of the through-opening. It is preferable that the vertical portion has at least one cut-out at an upper end thereof.

According to another aspect of the invention, a manufacturing method for producing an upper guide rail of a seat slide device, comprises the steps of press-working a piece of metal sheet to produce a symmetrical channeled member having a pair of flanged sections at its both ends, punching the symmetrical channeled member through an opening end of the symmetrical channeled member to produce at least one circular through-opening in an essentially middle between a first flanged section of the flanged sections and an axis of symmetry of the symmetrical channeled member, burring or hole-flanging the symmetrical channeled member through the opening end to produce at least one burred or hole-flanged hole in an essentially middle between a second flanged section of the flanged sections and the axis of symmetry simultaneously with the punching step, so that the circular through-opening and the burred or hole-flanged hole are symmetrical with respect to the axis of symmetry, bending the symmetrical channeled member along the axis of symmetry so that the symmetrical channeled member is doubled over and a burred or hole-flanged portion of the burred or flanged hole is partially inserted into the circular through-opening, and caulking the burred or hole-flanged portion of the burred or flanged hole onto a perimeter of the circular through-opening. It is preferable that the additional step of inserting a parallel pin into the burred or flanged hole is provided after the bending step, so as to enlarge an inside diameter of the burred or flanged hole and to adequately insert the burred or hole-flanged portion of the burred or flanged hole into the circular through-opening.

BRIEF DESCRIPTION OF THE DRAWINGS

FIG. 4(a) showing a state just after press-working a piece of metal plate, FIG. 4(b) showing a state wherein the pressed metal plate is bent along its central line P, FIG. 4(c) showing a state wherein the burred portion is inserted into the punched hole, and FIG. 4(d) showing a state wherein the inserted burred portion is further caulked.

DESCRIPTION OF THE PREFERRED EMBODIMENTS

Figure 1:
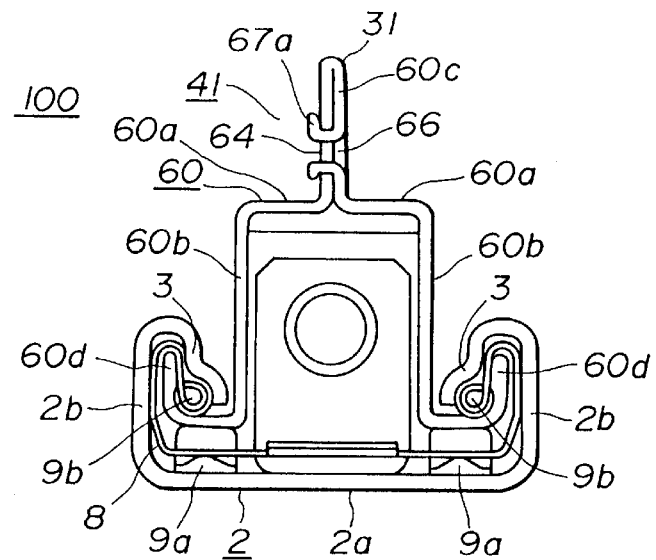
FIG. 1 is a lateral cross-sectional view illustrating one embodiment of a seat slide device made according to the present invention.
Figure 2:
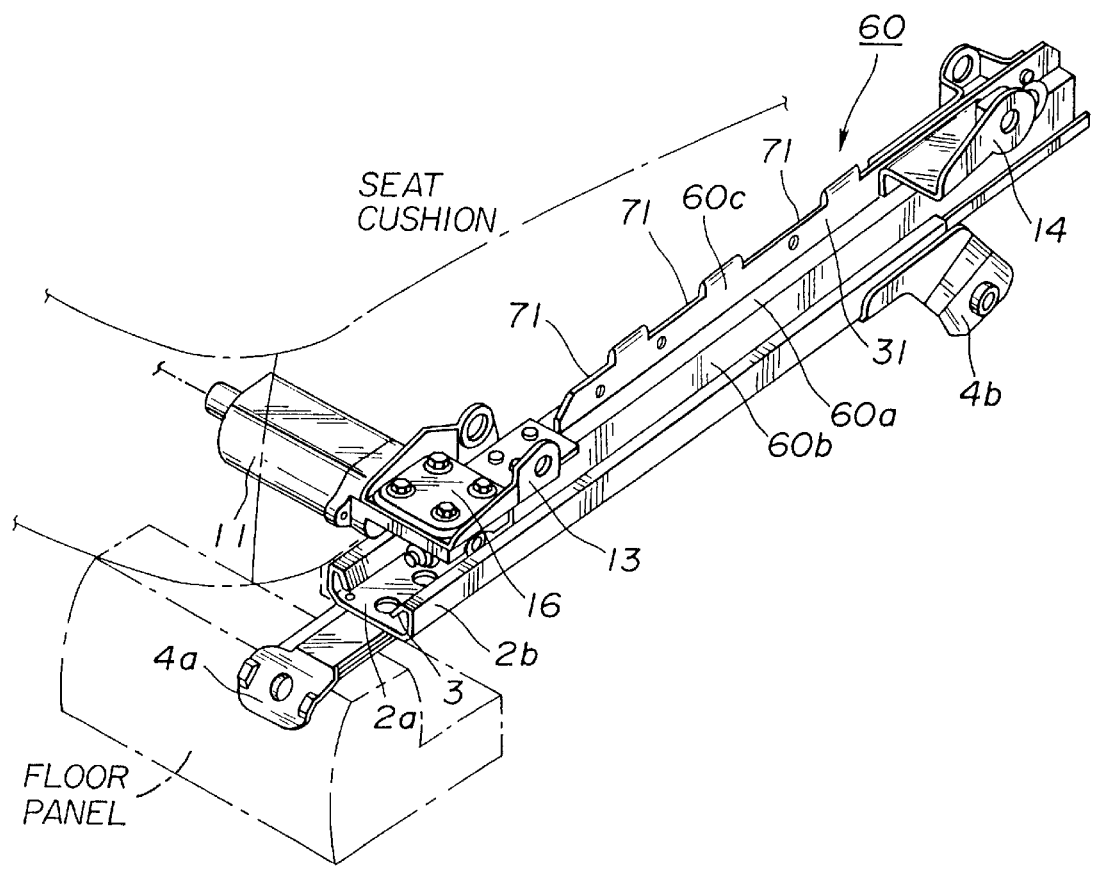
FIG. 2 is a perspective view illustrating a left-hand side of the seat slide device made according to the invention.
Figure 3:
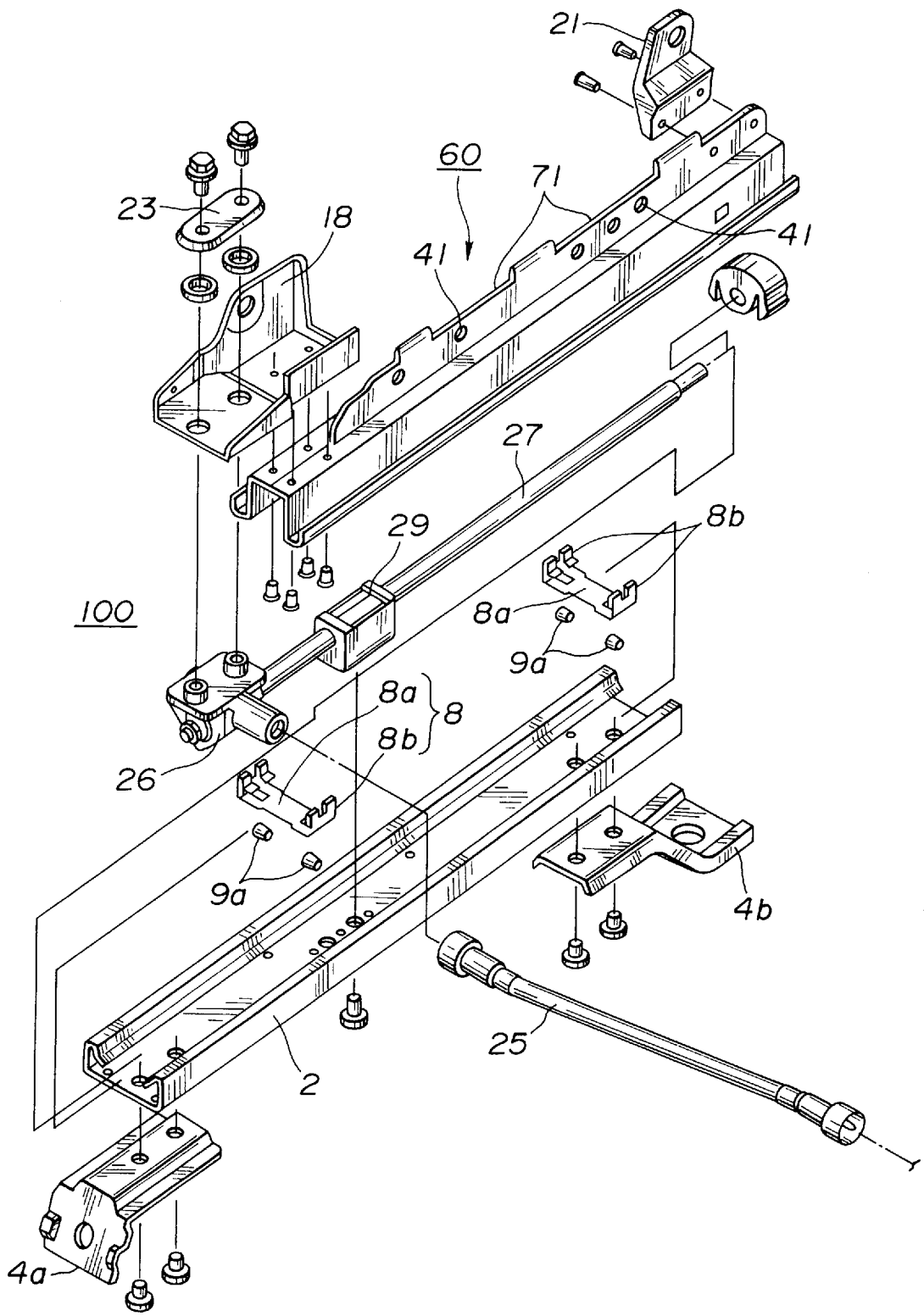
FIG. 3 is an exploded perspective view illustrating a right-hand side of the seat slide device made according to the invention.
Figure 6:
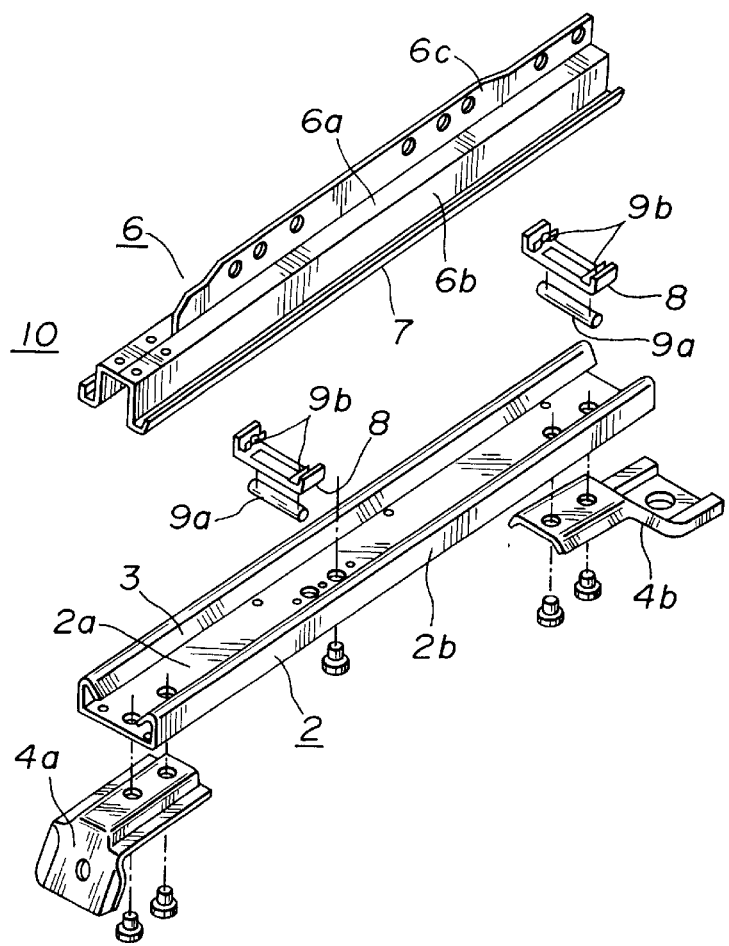
FIG. 6 is a schematic exploded perspective view illustrating another example of a prior art seat slide device.

Referring now to the drawings, particularly to FIGS. 1 to 3, the seat slide device of the invention is exemplified in case of a motor-powered seat slide device for an automobile seat. Except the upper guide rail structure, the basic construction of the seat slide device of the preferred embodiment as shown in FIGS. 1 to 4(d) is similar to that of the prior art seat slide device as shown in FIG. 6. Therefore, the same reference numerals used in the prior art seat slide device shown in FIG. 6 will be applied to the corresponding elements used in the embodiment of FIGS. 1 to 4(d), for the purpose of comparison between the prior art and the embodiment. As can be appreciated from the lateral cross section shown in FIG. 1 and from the manufacturing processes of the upper guide rail shown in FIGS. 4(a) to 4(d), the seat slide device of the embodiment is different from the prior art seat slide device in that the upper guide rail 60 is formed by bending a piece of metal sheet 31. As seen in FIGS. 2 and 3, the seat slide device 100 of the embodiment is comprised of a left-hand side guide rail unit shown in FIG. 2 and a right-hand side guide rail unit shown in FIG. 3. As clearly seen in FIG. 1, the lower guide rail 2 of the seat slide device 100 consists of an upwardly-opening, substantially C-channeled bottom portion 2a, a pair of side wall portions 2b, and an opposing pair of flanged portions 3 inwardly bent from upper ends of the side wall portions 2b, respectively into a substantially inverted U-shape. As seen in FIGS. 2 or 3, front and rear ends of the lower guide rail 2 is fixed onto the floor panel of the vehicle respectively through front and rear mounting brackets 4a and 4b. On the other hand, the upper guide rail 60 is comprised of a pair of right-angled portions each consisting of an upper wall 60a and a side wall 60b, a pair of flanged portions 60d outwardly bent from the lower ends of the side wall portions 60b, respectively into a substantially L-shape, and a vertical portion 60c extending along the central line of the upper walls 60a. The outwardly-bent flanged portion 60d (serving as an engaged portion) of the upper guide rail 60 is engaged with the inwardly-bent flanged portion 3 (serving as an engaging portion) of the lower guide rail 2 via a plurality of ball bearings 9b. In the shown embodiment, although the ball bearings 9b are provided for more precisely positioning the location relationship between the upper and lower guide rails in their lateral direction, the ball bearings are often eliminated for the purpose of reducing manufacturing costs of the seat slide device. In this case, the inwardly-bent flanged portion 3 of the lower guide rail 2 would be in sliding-contact with the corresponding outwardly-bent flanged portion 60d of the upper guide rail 60. Generally, a sliding resistance of the seat slide device not employing ball bearings would be slightly greater in comparison with the seat slide device with ball bearings as well as rollers. Rollers 9a are disposed between the outwardly-bent flanged portions 60d of the upper guide rail 60 and the bottom portion 2a of the lower guide rail 2 for sliding movement of the upper guide rail to the lower guide rail. In a conventional manner, the ball bearings 9b and the rollers 9a are rotatably supported and guided by means of a carrier 8. As best seen in FIG. 3, the carrier 8 is comprised of a bottom section 8a supporting the rollers 9a and a pair of side wall sections 8b each supporting the ball bearing 9b. The vertical portion 60c is ordinarily used to mount a seat belt anchor, a base of a reclining mechanism, a lifter pivot shaft, and the like. In FIG. 2, reference 11 denotes an electric motor, references 13 and 14 denote brackets for a seat lifter, which is optionally installed on the seat slide device for producing an up-and-down motion of the seat cushion, and reference 16 denotes a vibration-isolating member. In FIG. 3, reference 18 denotes a bracket of the seat lifter, reference 21 denotes a seat belt anchor, reference 23 denotes a vibration-isolating member, reference sign 26 denotes a gear box, reference 25 denotes a torque-transmitting cable through which drive torque produced by the motor 11 is transmitted to the worm and worm-wheel incorporated in the gear box 26, reference 27 denotes a screw-threaded shaft, and a nut housing 29 threadably engaged with the screw-threaded shaft 27 and fixed to the bottom of the lower guide rail 2. In the shown embodiment, to produce the relative sliding movement of the upper guide rail 60 to the lower guide rail 2, the gear box 26 is firmly secured onto the upper guide rail 60 and also the screw-threaded shaft 27 is rotatably supported by the gear box 26 while preventing the shaft 27 from moving in the longitudinal direction of the guide rail.

As hereinbelow discussed in detail, the manufacturing processes for the upper guide rail 60 of the seat slide device 100 of the invention are performed as indicated by lateral cross-sections shown in FIGS. 4(a) to 4(d).

Figure 4A:
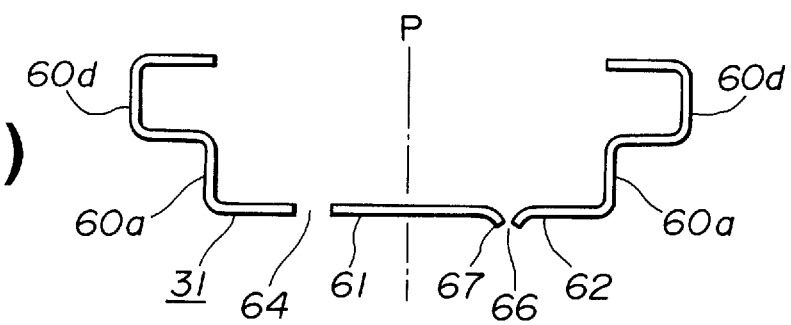
FIGS. 4(a) to 4(d) are cross-sectional views illustrating respective sequential processes for production of the upper guide rail incorporated in the seat slide rail.

A piece of metal sheet 31 is firstly worked into a press part shown in FIG. 4(a) by way of press-working, so as to produce a channeled member having the upper walls 60a, the side walls 60b and the flanged portions 60d. Thereafter, a plurality of circular through-openings or holes 64 are formed in a comparatively wide flat section 61 essentially in the middle of one side wall 60a and the center line P of the press-worked piece, by way of punching. Additionally, by way of burring or hole-flanging, formed in the wide flat section 62 essentially in the middle of the other side wall section 60a and the center line P are a plurality of flanged holes 66 each having burred portion or hole-flanged portion 67. Note that the circle hole 64 and the corresponding burred hole 66 are located respectively on the flat sections 61 and 62, so that the associated holes 64 and 66 are symmetrical with respect to the center line P, and that the holes 64 and 66 are punched downwardly by a punching tool inserted through the opening end of the channeled member. The center line P functions as an axis of symmetry of the press-worked piece.

Figure 4B:
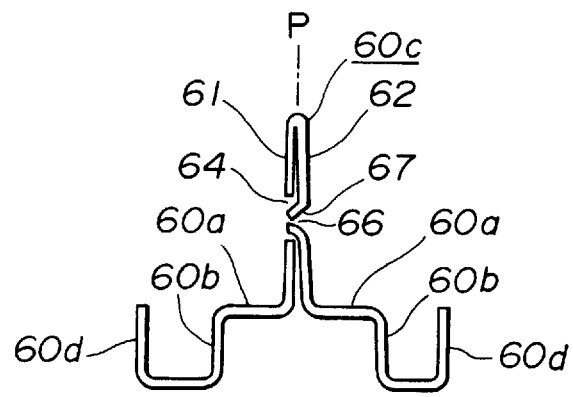

Thereafter, as seen in FIG. 4(b), the above-noted press-worked piece shown in FIG. 4(a) is bent or doubled over along the center line P such that the lower surface of the left-hand side flat section 61 and the lower surface of the right-hand side flat section 62 are abutted with each other. After bending, actually owing to a slight aperture between the opposing flat sections 61 and 62, resulting from slight elastic deformation of the bent metal piece, a part of the burred or hole-flanged portion 67 can be inserted into the corresponding circular hole 64. Then, the manufacturing process shifts from the bending process to a press-working process shown in FIG. 4(c). The press-working process of FIG. 4(c) ensures an easy caulking process shown in FIG. 4(d). In more detail, in FIG. 4(c), a pressing tool such as a parallel pin is inserted into the flanged hole 66, in order to adequately insert the burred or hole-flanged portion 67 into the corresponding circular hole 64 and additionally to properly enlarge the inside diameter of the burred or hole-flanged portion 67, thus forming the portion 67 into a proper shape such as a substantially cylindrical shape. As may be appreciated, the outside diameter of the parallel pin is properly selected depending on at least the inside diameter of the punched hole 64 and the thickness of the metal sheet 31. In the caulking process of FIG. 4(d), a caulking tool as indicated by the hatched line is used to securely caulk the burred or hole-flanged portion 67 of the right-hand side flat section 62 onto the perimeter of the circular hole 64 of the left-hand side flat section 61 by flaring and pressing the top end 67a of the burred or hole-flanged portion 67 onto the perimeter of the circular hole 64. The above-mentioned caulked portion formed through the burring or hole-flanging process, the press-working process, and the caulking process will be hereinafter referred to as a "burred-and-caulked portion 41". When a plurality of pairs of the circular hole 64 and the flanged hole 66 are all caulked through the process of FIG. 4(d), the opposing flat sections 61 and 62 are completely abutted to each other and united with each other preferably without any aperture therebetween. The bent and abutted flat sections 61 and 62 are cooperative with each other to construct the vertical portion 60c of the upper guide rail 60. As seen in FIGS. 2 and 3, in case of the upper guide rail employed in the seat slide device of the embodiment, a plurality of substantially rectangular cut-outs 71 are also provided in the upper guide rail 60. It is preferable that the plural cut-outs 71 are formed at the center of the press-working piece along the axis P of symmetry by way of punching in the same manner as the circular holes 64 and the flanged holes 66, after the press-working process shown in FIG. 4(a). The cut-outs 71 define locally lower-level sections of the upper guide rail 60, and are provided for preventing the upper guide rail 60 from interfering with the bottom member or frame of the seat cushion. As a result, the seat assembly can be set at a comparatively low level with respect to the floor of the vehicle. In the event that the cut-outs 71 are pre-formed in place simultaneously with the circular holes 64 and the flanged holes 66, the bending process of FIG. 4(b) may be easily and quickly achieved. In this case, the production time may be reduced effectively.

As will be appreciated from the above, since the upper walls 60a, the side walls 60b, the upper vertical portion 60c and the flanged portions 60d are integrally formed by bending a piece of metal sheet, the system of the embodiment does not require any welding work, and thus there is no welding distortion. The manufacturing process for the upper guide rail of the seat slide device made according to the invention can ensure a high accuracy of dimensions and geometry of the upper guide rail, and eliminate undesired play of the upper guide rail to the lower guide rail, thus insuring smooth sliding movement of the upper guide rail with respect to the lower guide rail. Also, the upper vertical portion 60c can be formed by bending or doubling over the press-worked metal piece along its axis P of symmetry, as shown in FIG. 4(a), and the opposing flat sections 61 and 62 are abutted to each other and united with each other by way of the burred-and-caulked portions 41 without any welding work. Thus, the thickness of the upper vertical portion 60c doubles the other portions of the upper guide rail 60, namely the upper walls 60a, the side walls 60b and the flanged portions 60d. Additionally, the upper guide rail has not any welding distortion, thus minimizing undesired stress concentration to the minimum. As a result, the entire mechanical strength of the upper guide rail is higher, as compared with the prior art upper guide rail structure. Also, in the event that a plurality of cut-outs 71 are formed simultaneously with the holes 64 and 66 by way of punching for the purpose of prevention of interference between the upper vertical portion 60c of the upper guide rail and the bottom of the seat cushion, just after the press-working process as shown in FIG. 4(a), the doubling or bending work as shown in FIG. 4(b) can be easily made, thus enhancing an efficiency of production of the upper guide rail. As appreciated, the upper guide rail of a high accuracy may facilitate assembly task of right-hand or left-hand seat slide guide rail units.

In the shown embodiment, although the seat slide device 100 is applied to a motor-powered seat slide device, it will be appreciated that the upper guide rail structure of the invention may be applied to a manually-operated seat slide device. Also the upper guide rail structure of the embodiment is so designed that the flanged portions 60d of the upper guide rail 60 are slidably fitted to the respective flanged portions 3 of the lower guide rail 2 in the inside of the lower guide rail. Alternatively, the upper guide rail may be fitted to the lower guide rail such that flanged portions of the upper guide rail cover respective flanged portions of the lower guide rail. In this case, the flanged portions of the upper guide rail must be bent inwardly, while the flanged portions of the lower guide rail must be bent outwardly.

Figure 4C:
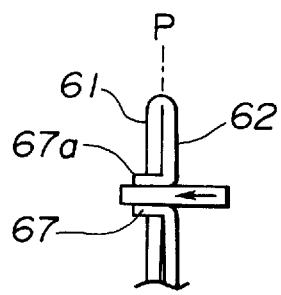
Figure 4D:
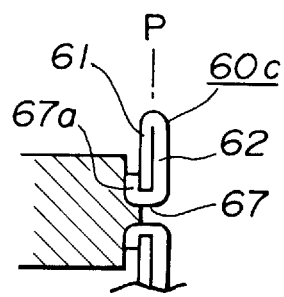
Figure 5:
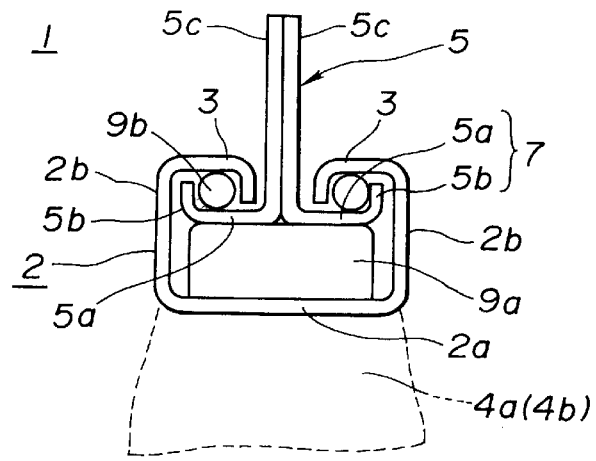
FIG. 5 is a lateral cross-sectional view illustrating one example of a prior art seat slide device.

In the preferred embodiment, although the press-working step shown in FIG. 4(c) is provided between the bending step shown in FIG. 4(b) and the caulking step shown in FIG. 4(d), the press-working step of FIG. 4(c) may be eliminated, if the burred portion 67 of the burred hole 66 is satisfactorily inserted into the circular hole 64 after the bending step of FIG. 4(b).

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A seat slide device comprising:

a lower guide rail adapted to be fixed onto a floor panel;

an upper guide rail slidably fitted onto said lower guide rail and adapted to be secured onto a bottom of a seat cushion; and rollers disposed between said upper and lower guide rails for sliding movement of said upper guide rail relative to said lower guide rail, wherein said upper guide rail comprises a downwardly-opening channeled portion, a vertical portion extending vertically and longitudinally from an upper wall of said downwardly-opening channeled portion, and flanged portions formed at lower ends of both side walls of said downwardly-opening channeled portion, and wherein said vertical portion, said downwardly-opening channeled portion, and said flanged portions of said upper guide rail are integrally formed of a single piece metal sheet bent about longitudinal axes, the metal sheet being doubled over substantially at its middle to form said vertical portion.

2. A seat slide device comprising:

a lower guide rail adapted to be fixed onto a floor panel;

an upper guide rail slidably fitted onto said lower guide rail and adapted to be firmly secured onto a bottom of a seat cushion; and rollers disposed between said upper and lower guide rails for sliding movement of said upper guide rail relative to said lower guide rail, wherein said lower guide rail includes an upwardly-opening channeled portion through which said lower guide rail is adapted to be fixed onto the floor panel, and flanged portions formed at upper ends of both side walls of said upwardly-opening channeled portion, wherein said upper guide rail includes a downwardly-opening channeled portion fitted onto said upwardly-opening channeled portion of said lower guide rail, a vertical portion extending vertically and longitudinally from an upper wall of said downwardly-opening channeled portion, and flanged portions formed at lower ends of both side walls of said downwardly-opening channeled portion, and wherein said flanged portions of said upper guide rail slidably engage the respective flanged-portions of said lower guide rail, wherein said vertical portion, said downwardly-opening channeled portion, and said flanged portions of said upper guide rail are integrally formed of a metal sheet, and wherein said vertical portion is formed by doubling over said metal sheet essentially at a center of said metal sheet, and a first vertical wall section of said vertical portion has at least one through-opening, and a second vertical wall section opposing said first vertical wall section has at least one flanged hole opposing said through-opening, and wherein said first and second vertical wall sections are secured to each other by caulking a flanged portion of the flanged hole onto a perimeter of said through-opening.

3. The seat slide device according to claim 2, wherein said at least one flanged hole of said second vertical wall section comprises a burred portion.

4. A seat slide device comprising:

a lower guide rail adapted to be fixed onto a floor panel;

an upper guide rail slidably fitted onto said lower guide rail and adapted to be secured onto a bottom of a seat cushion; and rollers disposed between said upper and lower guide rails for sliding movement of said upper guide rail relative to said lower guide rail, wherein said lower guide rail includes an upwardly-opening channeled portion through which said lower guide rail is adapted to be fixed onto the floor panel, and flanged portions formed at upper ends of both side walls of said upwardly-opening channeled portion, wherein said upper guide rail includes a downwardly-opening channeled portion fitted onto said upwardly-opening channeled portion of said lower guide rail, a vertical portion extending vertically and longitudinally from an upper wall of said downwardly-opening channeled portion, and flanged portions formed at lower ends of both side walls of said downwardly-opening channeled portion, and wherein said flanged portions of said upper guide rail slidably engage the respective flanged portions of said lower guide rail, wherein said vertical portion, said downwardly-opening channeled portion, and said flanged portions of said upper guide rail are integrally formed of a metal sheet, wherein said vertical portion is formed by doubling over said metal sheet essentially at a center of said metal sheet, and a first vertical wall section of said vertical portion has at least one through-opening and a second vertical wall section opposing said first vertical wall section has at least one flanged hole opposing said through-opening, and wherein said first and second vertical wall sections are secured to each other by caulking a flanged portion of the flanged hole onto a perimeter of said through-opening, and wherein said vertical portion has at least one cut-out at an upper end thereof.

5. The seat slide device according to claim 4, wherein said at least one flanged hole of said second vertical wall section comprises a burred portion.

* * * * *